United States Patent [19]
Monrolin

[11] 3,908,896
[45] Sept. 30, 1975

[54] DIGITAL RESOLVER FILTER AND RECEIVER USING SAME

[75] Inventor: Jean Louis Monrolin, Tourettes sur Loup Alpes Maritimes, France

[73] Assignee: International Business Machines Corporation, Armonk, N.Y.

[22] Filed: Apr. 3, 1974

[21] Appl. No.: 457,334

[30] Foreign Application Priority Data

May 11, 1973 France ............................ 73.17607

[52] U.S. Cl. ................ 235/152; 235/156; 328/165; 333/18; 333/28 R; 333/70 T

[51] Int. Cl. ......................... H04b 3/14; G05b 13/02

[58] Field of Search ............ 235/152, 156; 328/165, 328/167; 333/18, 28 R, 70 R, 70 T

[56] References Cited

OTHER PUBLICATIONS

Taylor, M. G., *A Technique for Using a Time-Multiplexed Second Order Digital Filter Section for Performing Adaptive Filtering*, In IEEE Trans. Comm., March 1974, pp. 326–330.

*Primary Examiner*—Malcolm A. Morrison
*Assistant Examiner*—R. Stephen Dildine, Jr.
*Attorney, Agent, or Firm*—Edward H. Duffield

[57] ABSTRACT

A combination purely recursive digital filter and a resolver is disclosed in which the phase relationship between an extracted signal and a reference phase is measured and used to eliminate the phase error so determined.

27 Claims, 9 Drawing Figures

FIG. 5b

DIGITAL RESOLVER FILTER AND RECEIVER USING SAME

FIELD OF THE INVENTION

This invention relates to a digital filter incorporating means for adjusting the phase of the output signal thereof, and to a system for recovering information used to synchronize the reception of data, said system using said filter to synchronize its local clock with the received data.

PRIOR ART

In the conventional digital receiver, the useful information is recovered by sampling the input signal. It is, therefore, necessary to know as precisely as possible the instants at which the input signal is to be sampled. In the prior art devices which perform these functions, the input signal is filtered in order to derive therefrom information referred to as clock information. This permits the determination of the sample instants and is used to control a phase-locked oscillator (PLO). The PLO, in turn, controls the phase and frequency adjustments of the local clock of the receiver. These adjustments, operated sequentially in the prior art, entail a considerable reduction in the speed of operation of the transmission system.

OBJECTS OF THE INVENTION

It is therefore an object of the present invention to provide a device or resolver filter capable of performing simultaneously the filtering and phase adjustment functions.

It is another object of the present invention to provide a device which permits simultaneous correction of the phase of the clock information already extracted from the signal received by a digital receiver and the local clock of said receiver.

The foregoing and other objects, features and advantages of the invention will be apparent from the following more particular description of a preferred embodiment of the invention, as illustrated in the accompanying drawings.

FIGS. *2a–2c* show the shape of the signals before and after the filtering operation.

Figure 3:
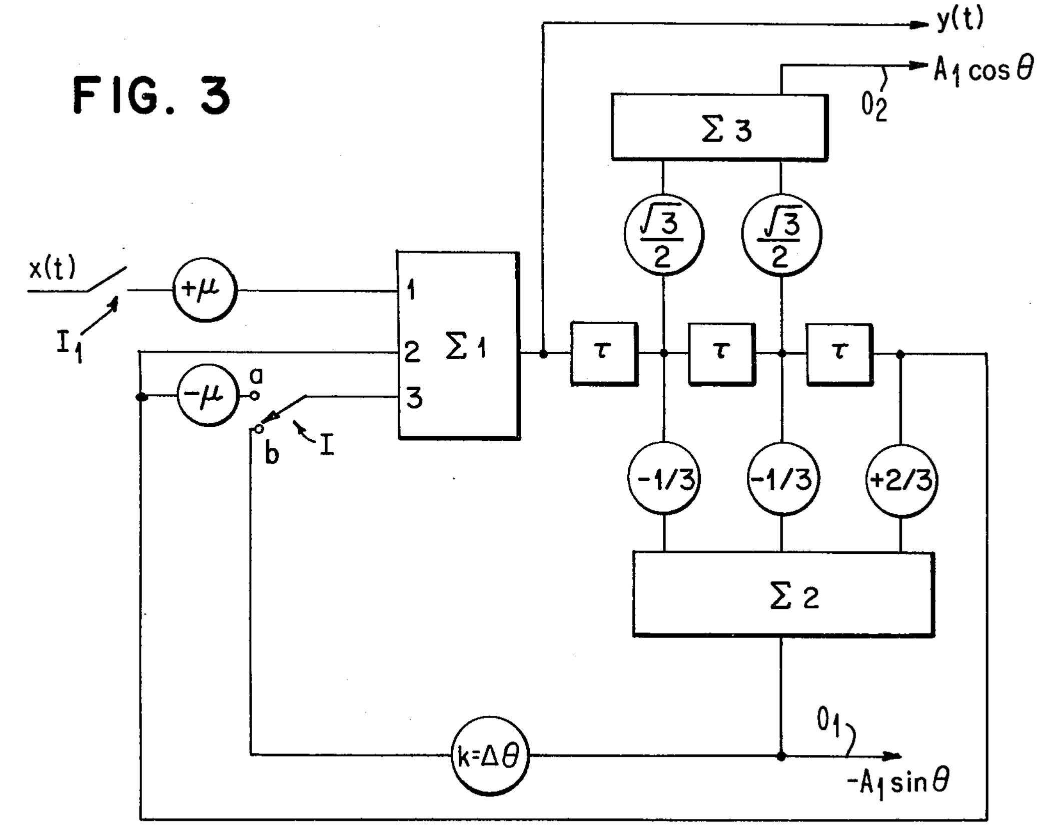

FIG. 3 illustrates an embodiment of the resolver filter of the invention.

Figure 4:
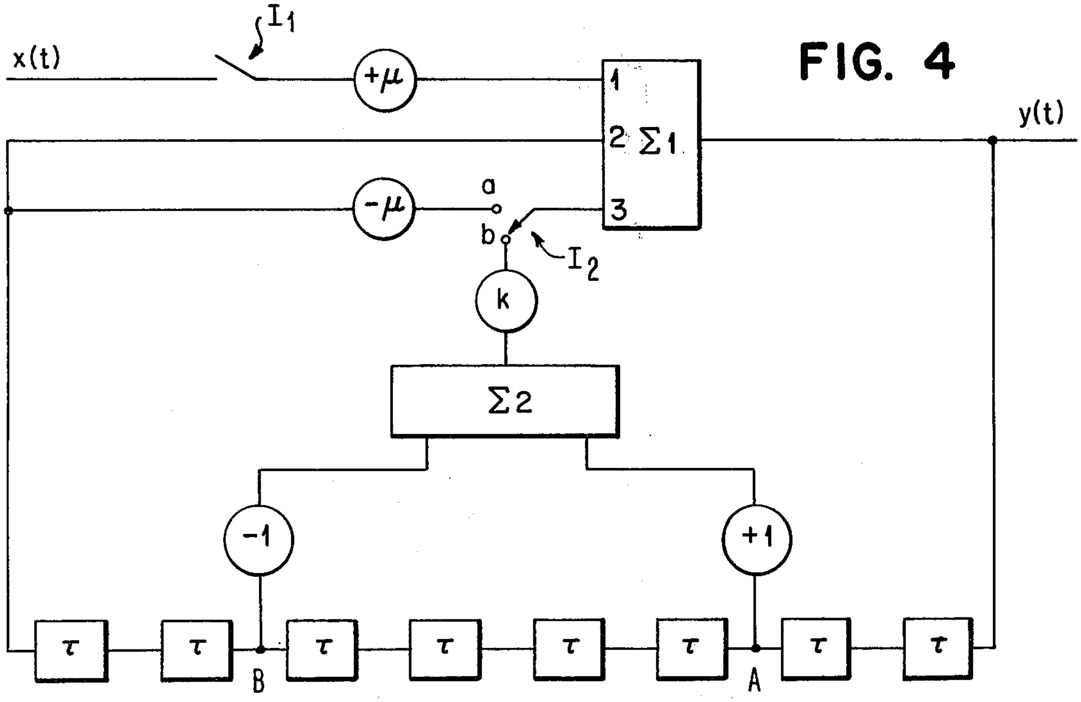

FIG. 4 illustrates another embodiment of the invention.

FIG. *5a* is a schematic diagram illustrating the use of the device of the invention as incorporated in the clock information recovery circuits of a digital receiver.

FIG. *5b* is a schematic diagram of the DET $\theta$ circuit of FIG. *5a*.

Figure 6:
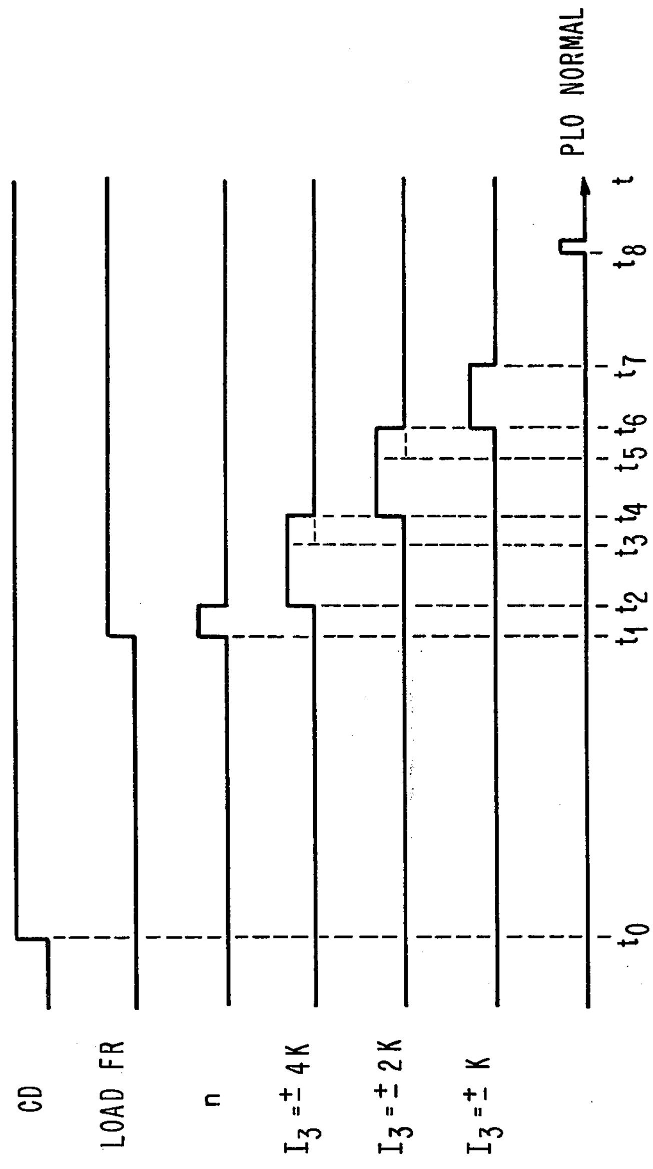

FIG. 6 is a timing diagram for the device of FIG. *5a*.

DETAILED DESCRIPTION

Figure 1:
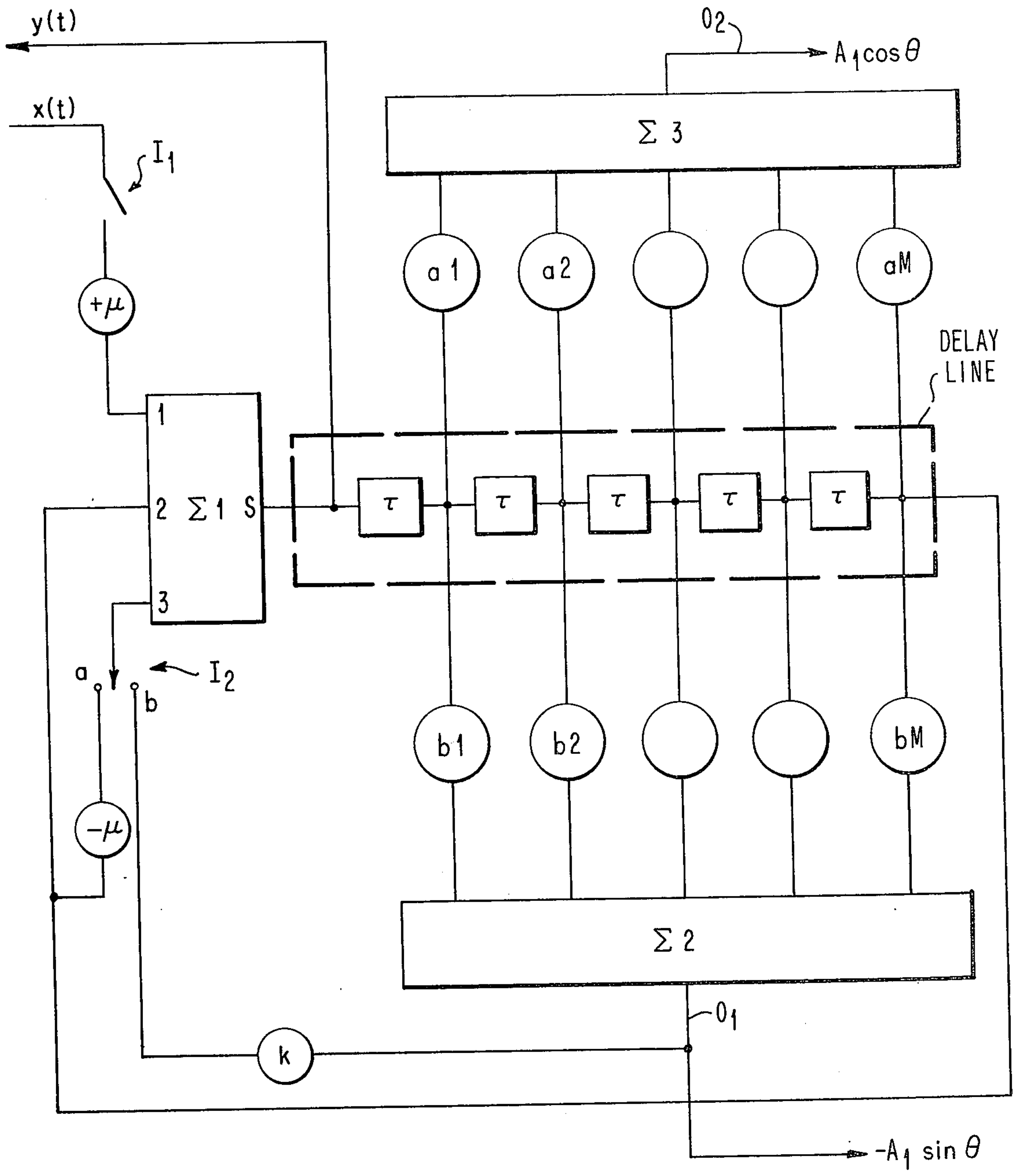
FIG. 1 is a schematic diagram illustrating the resolver filter of the present invention.

Referring now to FIG. 1, a schematic diagram of the device of the invention is shown. The device comprises a number of elements which enable it to operate both as a purely recursive digital filter and as a resolver circuit. As used herein, the term resolver refers to a device used to determine the phase relationship between the signal extracted by the filter and a reference phase, and to eliminate the phase error so determined.

The device of FIG. 1 includes three digital adder stages $\Sigma 1$, $\Sigma 2$ and $\Sigma 3$, a delay line or shift register comprised of a plurality of elementary delay elements $\tau$, a pair of switches $I_1$, $I_2$, and multiplier stages. The latter stages are represented by circled letters. These stand for the multiplication or weighting coefficient of the signal taken at the point of the delay line to which the multiplier is connected, before the weighted signal is applied to the input of one of the adder stages.

More specifically, adder stage $\Sigma 1$ has three inputs, 1–3, and one output S. The signal $x(t)$ to be processed by the device of the invention is applied through multiplier $+\mu$ and switch $I_1$ to input 1 of adder $\Sigma 1$. Input 2 is connected to the output of the delay line consisting of delay elements $\tau$. The input of the delay line is connected to output S from which is taken the filtered signal $y(t)$ provided by the device of the invention. The output of the shift register (delay line) is also connected to terminal *a* of switch $I_2$ through a multiplier $-\mu$. The movable contact of switch $I_2$ is connected to input 3 of $\Sigma 1$. The taps between elements $\tau$ are respectively connected to multipliers $b1$–$b$M the outputs of which are connected to the inputs of $\Sigma 2$. Output $O_1$ of $\Sigma 2$ is connected to the input of a multiplier K the output of which is connected to terminal *b* of switch $I_2$. The taps are also connected to the inputs of $\Sigma 3$ through multipliers $a1$–$a$M.

With switch $I_1$ closed and switch $I_2$ set to *a*, the device described thus far operates as a digital filter and forms a purely recursive filter of a well known type. It is not believed necessary to further describe this unit, which is discussed in detail in various publications, particularly in "IEEE Transactions on Audio and Electroacoustics," Vol. Au-18, No. 2, June, 1970, pages 123–129 and 137–141 and in an article by Charles M. Rader and Bernard Gold in "Proceedings of the IEEE," Vol. 55, No. 2, February, 1967, pages 149–161.

For the purposes of the present specification, it will be sufficient to recall that a digital filter exhibits in the frequency domain a comblike spectrum, that is, a spectrum with evenly spaced lobes which appear about frequency zero and about sampling frequency FO for a signal $x(t)$ and of each of its harmonics. The particular digital filter described herein exhibits a gain equal to 1 and a bandwidth which may be made relatively narrow for each lobe by appropraite selecting the value appropriate coefficient $\mu$.

Figure 2A:
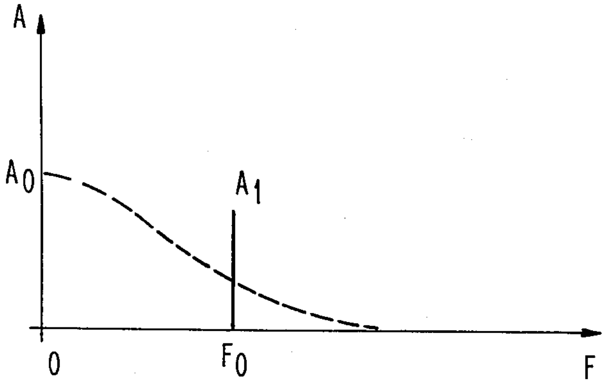
Figure 2B:
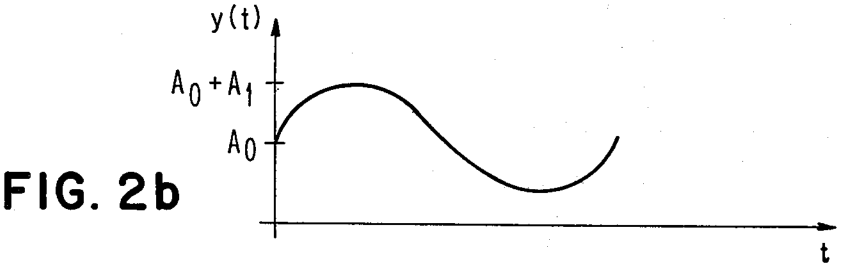
Figure 2C:
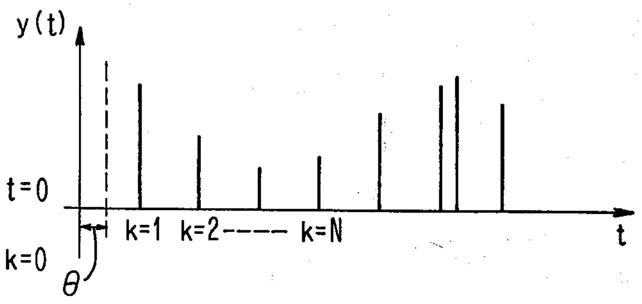

As a result, if the spectrum of signal $x(t)$ as a function of frequency F and amplitude A is similar to that shown in FIG. *2a*, the signal $y(t)$ extracted by the filter will essentially consist of a D. C. component A*o* upon which is superimposed a sine wave of sampling frequency FO (see FIG. 2B). Two remarks must be made at this point. The first is that, in practice, signals $x(t)$ and $y(t)$ are sampled. The second remark concerns the phase of signal $y(t)$. In the particular application described hereafter, the ideal case is that where a peak of signal $y(t)$ is selected as the origin of the phases. But when operation is initiated there is no reason to assume that the initial phase of the signal provided by the filter corresponds to the ideal case. This explains the spectrum of FIG. *2c* generated by periodic sampling of $x(t)$. The error associated with phase $\theta$ must be first measured before any phase correction can be performed.

Assuming that the filtered signal contains M samples per period $T_o$, the $k^{th}$ sample will be defined by the following expression (M being defined by the sampling rate of the sample clock, not shown):

$$y^{(k)} = A_o + A_1 \cos\left(\frac{2\pi k}{M} + \theta\right) \quad \text{with } k = 0, 1, 2, \ldots$$

where $\theta$ is the phase of the signal at the instant $t = 0$.

A sample $y_1^{(k)}$ exhibiting a phase difference of $\Delta\theta$ relative to $y^{(k)}$ wowuld have the following value:

$$y_1^{(k)} = A_o + A_1 \cos\left(\frac{2\pi k}{M} + \theta + \Delta\theta\right)$$

$$= A_o + A_1 \cos\left(\frac{2\pi k}{M} + \theta\right) \cos\Delta\theta - A_1 \sin\left(\frac{2\pi k}{M} + \theta\right) \sin\Delta\theta.$$

If the value of $\Delta\theta$ is small, $\cos\Delta\theta \approx 1$ and $\sin\Delta\theta \approx \Delta\theta$, hence $$y_1^{(k)} = A_o + A_1 \cos\left(\frac{2\pi k}{M} + \theta\right) - A_1 \Delta\theta \sin\left(\frac{2\pi k}{M} + \theta\right).$$

$$y_1^{(k)} = y^{(k)} - A_1 \sin\left(\frac{2\pi k}{M} + \theta\right) \times \Delta\theta. \qquad (1)$$

The phase of any signal provided by the filter can therefore be shifted by $\Delta\theta$ by recomputing each of its samples $y_1$ from samples $y$, using Eq. (1). This function is performed by the device illustrated in FIG. 1 and subsequent figures when used as a resolver. As will become apparent later, this function is more significant than it might be supposed at this stage in that it permits, both to measure $\Delta\theta$ and to shift the signal phase by the same amount.

The operation of the device when used as a resolver to shift the phase of the filtered signal by $\Delta\theta$ will not be described. As previously mentioned, with switch $I_1$ closed and switch $I_2$ set to terminal $a$, the device operates as a filter, thereby providing a filtered signal $y(t)$ and, in addition, causing samples of signal $y(t)$ to be stored in the elements $\tau$ of the shift register delay line. If switch $I_1$ is then opened and switch $I_2$ set to $b$, the device transfers all samples stored in the shift register back to said resolver and modifies them in accordance with Eq. (1) before reintroducing them into the register, thereby shifting the phase of the filtered signal still stored in the filter delay line by $\Delta\theta$. To do so, multiplier K must be given the value $\Delta\theta$ and coefficients $b1$–$b$M must be given values such that the value of signal $O_1$ from stage Σ2 be equal to $-A_1 \sin\theta$.

The values of coefficients $b1$–$b$M can be determined by means of the following expression:

$$\sum_{i=1}^{M} b_i \left[A_o + A_1 \cos\left(\frac{2\pi i}{M} + \theta\right)\right] = A_1 \sin\theta.$$

$$A_o \sum_{i=1}^{M} b_i + A_1 \cos\theta \sum_{i=1}^{M} b_i \cos\frac{2\pi i}{M} - A_1 \sin\theta \sum_{i=1}^{M} b_i \sin\frac{2\pi i}{M} = A_1 \sin\theta$$

hence $$\begin{cases} \sum_{i=1}^{M} b_i = 0 \\ \sum_{i=1}^{M} b_i \sin\frac{2\pi i}{M} = 0 \\ \sum_{i=1}^{M} b_i \cos\frac{2\pi i}{M} = +1 \end{cases}$$

Assuming, by way of example, that M=3, the values of the coefficients would be determined as follows, as shown in FIG. 3:

$$b_1 + b_2 + b_3 = 0$$

$$\frac{\sqrt{3}}{2} b_1 - \frac{\sqrt{3}}{2} b_2 = 0$$

$$-\frac{1}{2}(b_1 + b_2) + b_3 = -1$$

hence $$b_1 = b_2 = -\frac{1}{3}$$

and $$b_3 = +\frac{2}{3}.$$

A similar method could be used to cause the value of the output signal $O_2$ from stage Σ3 to be equal to $A_1 \cos\theta$, in which case the values of the weighting coefficients $a1$–$a$M would be given by the following expressions:

$$\sum_{i=1}^{M} a_i \left[A_o + A_1 \cos\left(\frac{2\pi i}{M} + \theta\right)\right] = A_1 \cos\theta.$$

$$A_o \sum_{i=1}^{M} a_i + A_1 \cos\theta \sum_{i=1}^{M} a_i \cos\frac{2\pi i}{M} - A_1 \sin\theta \sum_{i=1}^{M} a_i \sin\frac{2\pi i}{M} = A_1 \cos\theta.$$

hence $$\begin{cases} \sum_{i=1}^{M} a_i = 0 \\ \sum_{i=1}^{M} a_i \cos\frac{2\pi i}{M} = 0 \\ \sum_{i=1}^{M} a_i \sin\frac{2\pi i}{M} = 1 \end{cases}$$

Referring back to the example of FIG. 3, where M=3, $$\begin{cases} a_1 + a_2 + a_3 = 0 \\ -\frac{1}{2}a_1 - \frac{1}{2} + a_3 = 0 \\ \frac{\sqrt{3}}{2}a_1 - \frac{\sqrt{3}}{2}a_2 = 1 \end{cases}$$

hence $$a_3 = 0;\ a_2 = -\frac{\sqrt{3}}{2};\ a_1 = \frac{\sqrt{3}}{2}$$

In addition to performing the filtering and phase shifting functions, the device of the invention serves to determine $\theta$ by combining, for example, output signals $O_1$ and $O_2$ to derive tan $\theta$. The device can therefore be used sequentially in two steps. During the first step, it will operate as a filter (with $I_1$ closed and $I_2$ set to $a$) while providing the information associated with the value of $\theta$. During the second step ($I_1$ open and $I_2$ set to $b$), it will serve to shift the phase of the filtered signal stored in the delay line by increments $\Delta\theta$ until the phase error is made equal to zero. The application described hereafter will permit a fuller understanding of the advantages of such a device, particularly in the data communication field.

It should be noted that some embodiments of the invention can be simpler than others and therefore provide a further advantage, as in the case illustrated in FIG. 4, where M=8 (or if M is a multiple of 8). Two taps at A and B are sufficient, where $b_1 = -1$ and $b_2 = +1$, provided A and B are located two elements $\tau$ and six elements $\tau$ away from the output $y(t)$ of the filter, respectively, when M=8. A sample of any rank $k$ which leaves the filter is defined by the following expression:

$$y^{(k)} = A_o + A_1 \cos\left(\frac{2\pi k}{M} + \theta\right)$$

The samples taken at A and B then have the respective values $$Y_A = A_o + A_1 \cos\left(\frac{2\pi k}{M} + \theta + \frac{\pi}{2}\right) = A_o + A_1 \sin\left(\frac{2\pi k}{M} + \theta\right)$$

$$Y_B = A_o + A_1 \cos\left(\frac{2\pi k}{M} + \theta + \frac{3\pi}{2}\right) = A_o - A_1 \sin\left(\frac{2\pi k}{M} + \theta\right)$$

hence $$Y_A - Y_B = -2\,A_1 \sin\left(\frac{2\pi k}{M} + \theta\right) \quad (2)$$

Eq. (2) shows that the sample $y_1^{(k)}$ shifted by $\Delta\theta$ which it is desired to obtain by means of the device of the invention, when performing its phase-shifting function, is provided by the arrangement of FIG. 4, with switch $I_1$ closed and switch $I_2$ set to $b$, if $$K = \frac{\Delta\theta}{2}.$$

The advantages of the resolver filter of the present invention have already been mentioned. Its usefulness in the data transmission field, particularly where digital data serves to modulate the phase and/or amplitude of a carrier,, will now be shown. In those systems which use this type of transmission, the useful information consists of digital elements appearing in the transmitter at a fixed rate determined by a local clock. These elements modulate the carrier before they are transmitted. The resultant signal applied to the transmission line takes the form of an amplitude and/or phase-modulated analog signal. Obviously, the digital receiver must, in order to extract said useful information, be synchronized with the transmitter's clock. That is, the phase and the frequency of the signals generated by the receiver's clock must be synchronized with those of the signals generated by the transmitter's clock. To this end, a pilot signal which is either inherent in the transmitted signal or superimposed thereon is extracted therefrom at the receiving end to enable the digital data recovery oeprations to be synchronized. This pilot signal is referred to as "signal clock." It is known that the envelope of signals transmitted in accordance with the method applicable to the present invention includes a sine wave component the frequency of which matches the desired clock frequency and the phase of which is shifted by a known, fixed value relative to that of said clock. Reference may be made in this regard to U.S. Pat. No. 3,564,412. In the present invention, the receiver examines the input signal by using a local reference the frequency of which is approximately correct, and derives therefrom the information it requires to compute said envelope and extract therefrom the sine wave corresponding to the signal clock. The first operation can be performed by the device of the present invention operating as a filter. Simultaneously, the phase error $\theta$ of the local clock relative to the signal clock can be determined. Then, during a second operation, the local clock is adjusted and, simultaneously, the phase of that portion of the signal clock which is stored in the delay line of the resolver filter is corrected. These operations are performed using the resolver filter described above.

Figure 5A:
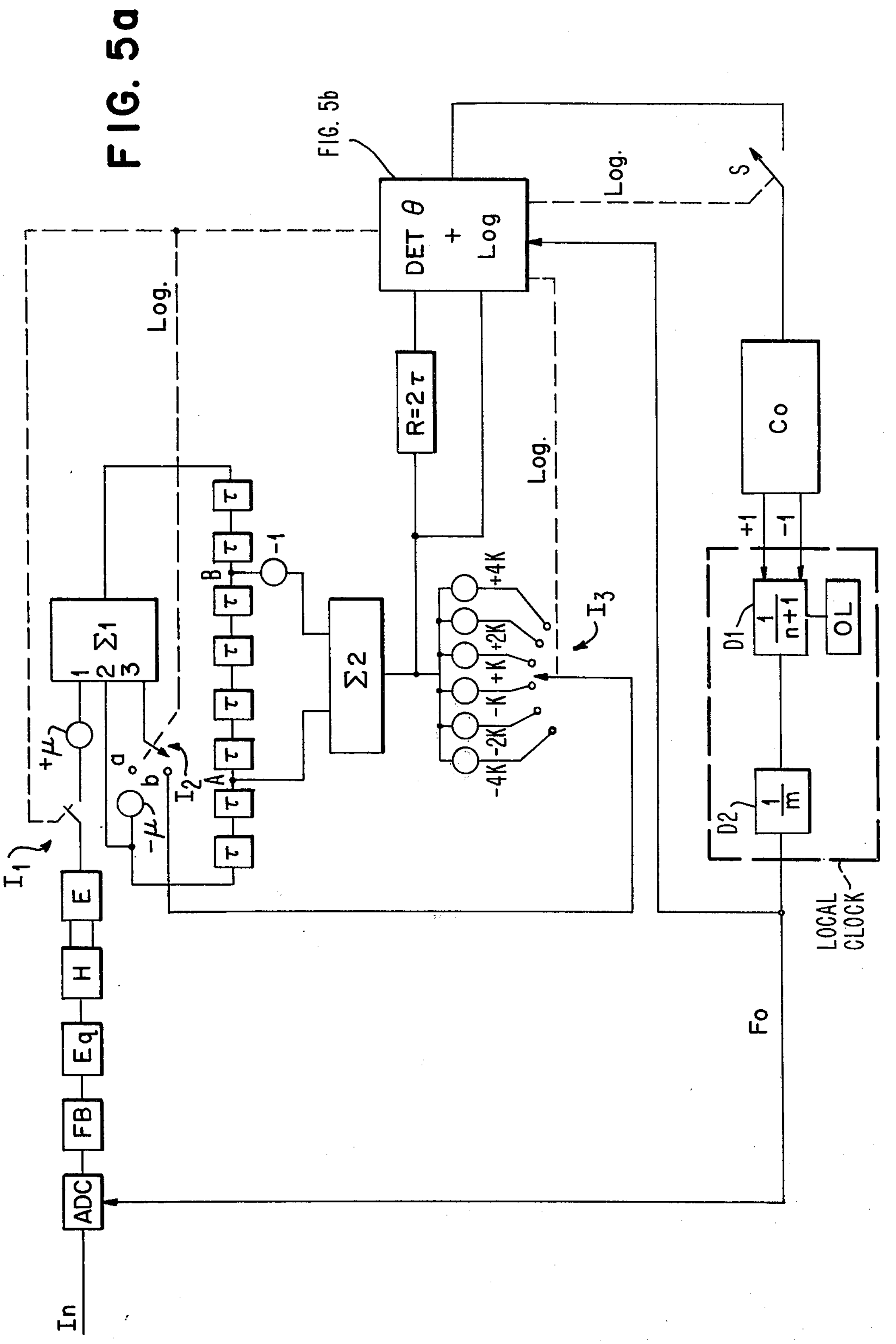

Referring now to FIG. 5*a*, there is shown a schematic diagram of a digital receiver incorporating the resolver filter of the present invention. The system illustrated in FIG. 5*a* essentially consists of an analog-to-digital converter, ADC, to the input of which is applied the amplitude and/or phase-modulated signal received from the transmission line. The output information generated by converter ADC isthen filtered by is then of a device FB and equalized by another device Eq. Both of the latter devices, which are widely used in the data transmission field, are intended to eliminate the noise and the distortions which may have been introduced by the transimssion line. The signal then undergoes a Hilbert transformation in a stage H to allow the information relating to the input signal envelope to be extracted using a device E. All of these devices are conventional and will not further be described. However, reference may be made, concerning devices H and E, to an article entitled, "A Fast Amplitude Approximation for Quadrature Pairs," in the Bell System Telephone Journal, Vol. 50, October, 1971, page 2849.

The output signal from E is applied to the input of a resolver filter similar to that of FIG. 4, which provides the required phase information by means of a circuit DET $\theta$. It should be noted that, in this example, instead of deriving $\theta$ from tan $\theta$, a different method is followed, for reasons of economy only, as will be described later. The information obtained from stage DET $\theta$ is used to control two feedback loops simultaneously. The first of these loops allows the resolver function to be performed; the second loop, which extends through switch S, serves to correct the local clock of the receiver. This clock includes a local oscillator OL operating at a freuqency which is successively divided by $n$ in a divider D1, then by $m$ in a divider D2 ($n$ and $m$ being integers), to provide the sampling frequency F$o$ of the signal received at the input of converter ACD. The previously mentioned adjustments of the local clock are made by incrementing or decrementing $n$ by 1.These increments are obtained by storing a value defined by DET $\theta$ in counter C$o$, which may be stepped up or down, and by then decrementing same, as will be explained subsequently.

Referring now to FIG. 6, a timing diagram for the device of FIG. 5*a* is shown. When receiver operation is initiated, the local oscillator OL is set to a value such that the frequency F$o$ generated by the divider D2 is approximately correct. Let us now assume that a signal CD is detected at the input of converter ACD. Signal CD will be sampled at the frequency F$o$ and the samples obtained will be processed as mentioned above to provide at the output of stage E samples of the envelope of the signal applied to the receiver. The device of the present invention, operating as a filter, first extracts from the sampled envelope the desired sine wave representing the signal clock. In this example, these operations are performed at the rate of eight samples per period of the sine wave, this being done initially during some 10 of said periods so as to counteract the effects of the noise present on the transmission line whenever receiver operation is initiated. Trhoughout this time interval, up to time T1, switch $I_1$ is closed, switch $I_2$ is set to $a$ and switch S is open. The filter delay line is loaded with samples.

At any time N$\tau$, the value of the sample provided by the filter is defined by the following expression:

$$Y_{(N\tau)} = A_0 + A_1 \cos\left(\frac{2\pi N\tau}{8}+\theta\right).$$

If the signal obtained is examianed at that time, it will be found that it exhibits a phase $\alpha$ such as $$\alpha = \frac{2\pi N\tau}{8}+\theta$$

relative to a peak of the signal clock.

In other words, before shifting the phase to reduce $\theta$ to a value as close to zero as possible, it is necessary to wait for a sufficient number of samples to appear at the output of the filter to reach the sample which is closest to a peak, the position of the peaks in time being regarded here as a characteristic instant of the receiving system, as previously mentioned.

It will be obvious that several known methods could be used to solve this first problem, beginning with the method that consists in measuring the value of tan $\alpha$ from those of sin $\alpha$ and cos $\alpha$ which could be determined as stated above. Once the value of $\alpha$ is known, it is easy to determine the number $p$ of times that $\pi/4$ is to be added thereto to reach the value of $\alpha$ which is closest to $2\pi$. In other words, it is necessary to allow $p\tau$ to elapse before shifting the phase.

A slightly different method is followed in the case of the device of FIg. 5*a* since tan $\alpha$ is not measured.

At $tl$, the value of $A_1$ sin$\alpha$, available at the output of $\Sigma 2$, is loaded in a register R=2 until $A_1$ cos $\alpha$ appears at the same output at a time two $\tau$ delays later.

At that time, the device DET $\theta$, which is examining the information giving the sign of sin $\alpha$, cos $\alpha$, and cos $\alpha$cos$\alpha$ - sin $\alpha$, determines therefrom the octant of the trigonometric circle in which was located the sample coming out of the filter at $tl$, and further determines $p$, or more exactly the number of samples which must appear at the output of the filter before the sample closest to a characteristic instant is obtained. The circuit DET $\theta$ includes a logic portion which maintains switch $I_2$ set to $a$ during $p$ (the logic lines are indicated by broken lines in FIG. 5*a*).

Figure 5B:
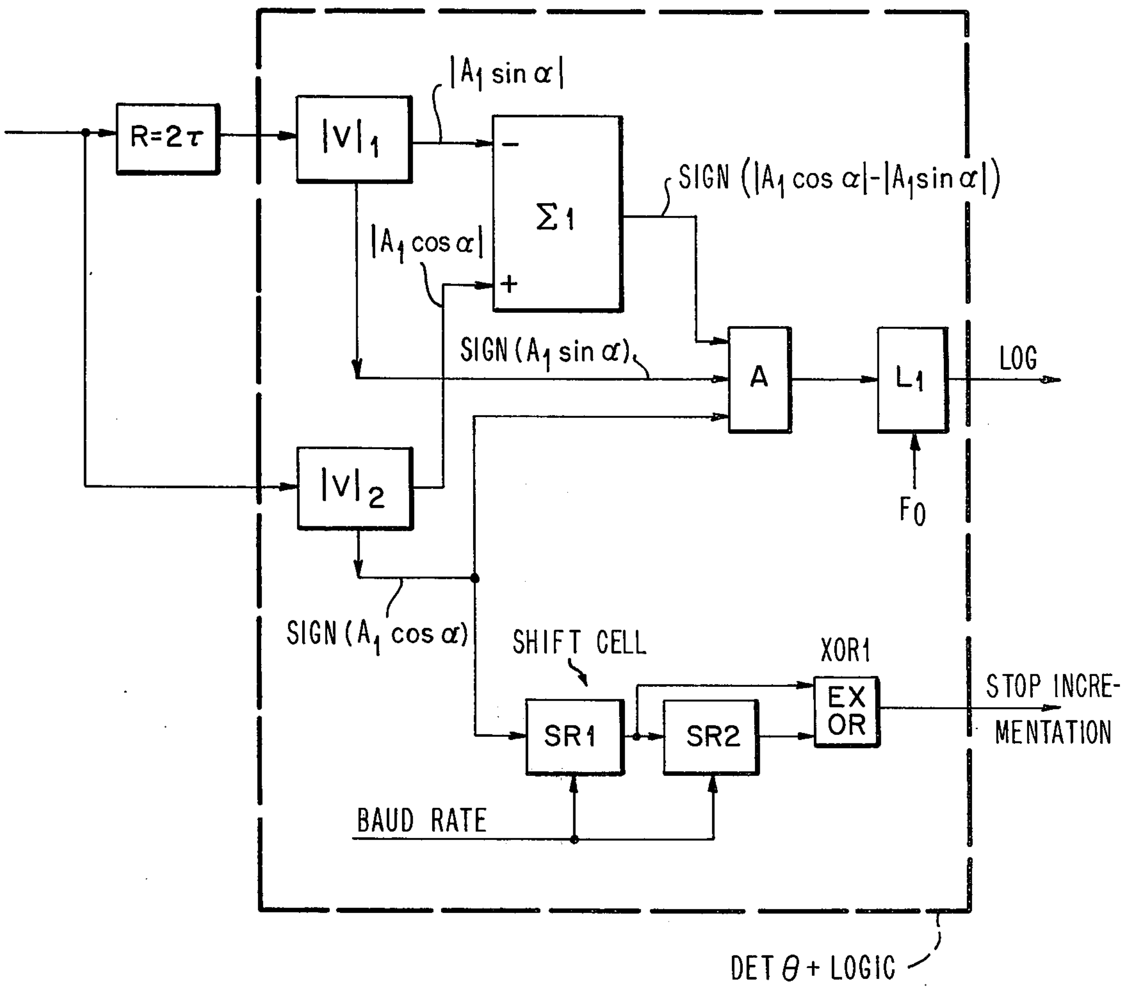

Such a logic may be implemented according to FIG. 5*b*. Assuming that $\Sigma 1$ and $\Sigma 2$ of FIG. 5$a$ are digital adders, $\Sigma 2$ will provide a digital signed word from which amplitude and sign information may be separated. This last operation is achieved in the detectors $|V|_1$ and $|V|_2$, respectively fed with the output and and input of the shift register R = $2\tau$. Amplitude informations are then compared in adder $\Sigma'$ which delivers only the sign information of $$\left|A_1 \cos\left(\frac{2\pi N\tau}{8}+\theta\right)\right|-\left|A_1 \sin\left|\left(\frac{2\pi N\tau}{8}+\theta\right)\right|\right|.$$

The three required sign infomrations mentioned above, i.e., signs of: sin $\alpha$, cos $\alpha$ and cos $\alpha$ - sin $\alpha$ are therefore available. They are fed to AND gate Gl, the output of which is up when all three signs are positive. This means that $\alpha$ is in the first octant of the trigonometric circle or, in other words, that the last input sample just fed to the resolver-filter is close to a peak of the clock sine wave. Resolver operation should be started to bring it closer to that peak by a phase shifting operation. At the next $F_0$ pulse, latch L1 is set on and delivers the logic information disclosed on FIG. 5*a*, starting the resolver operation (time $=t2$). As mentioned above, this phase shifting may be achieved by successive steps of $\Delta\theta$ at each baud time. According to the iteration, at each baud time, the function Sign (A sin $(\alpha - \Delta\theta)$ is tested. As soon as this sign differs from the preceeding one, a XOR1 is energized to stop the resolver operation. The receiver clock recovered information is as good as possible.

One may see that such a process using small fixed increments $\Delta\theta$ may be too long in time. This is why, actually, the device of FIG. 4 has been slightly modified to allow the phase to be corrected by successive approximations. To this end, the output of $\Sigma2$ is connected to six weighting stages, +K, +2K, +4K and their complements −K, −2K, −4K, instead of to a single weighting stage, and a switch $I_3$ has been added. At $t2$, $I_1$ is open, $I_2$ is set to *b* and $I_3$ is set to position 4K. The resolver shifts the phase of the filtered signal stored in the delay line by arctan 4K = 2$\Delta\theta$ by causing the N samples stored in the filter delay line to recirculate in the resolver. The closure of switch S at $t2$ under control of the logic portion of DET $\theta$ then serves to adjust the local clock of the receiver. For that purpose with S closed at time $t2$, counter C*o* is loaded with a value 4*q* supplied by the logic of DET $\theta$ and corresponding to the amount by which divider D1 is to be decremented to compensate for a phase shift of 2$\Delta\theta$.

At time $t3$, S is open, $I_1$ is closed and $I_2$ is again set to *a*. The filtering and measuring process described above is then repeated. Depending on whether or not the measurements of sin $\alpha$ and cos $\alpha$ point to a change of octant in the trigonometric circle, the new phase shift will either have the same sign as before or the opposite sign. This time, the absolute value of the amplitude of the new phase shift may be arctan 2K = $\Delta\theta$, or, as before, arctan 4K. At time $t4$, a second phase shift is effected by closing $I_1$, setting $I_2$ to *b* and setting $I_3$ to a position corresponding to a multiplication of the output from 2 by ±2K. If a change of octant has been detected, the logic portion of DET $\theta$ will select −2K; otherwise, +2K will be selected. The closure of switch S causes a value of $\pm2q$ corresponding to a phase shift of ±2K to be loaned into counter C*o*, and the procedure for adjusting frequency F*o* is resumed in the manner described above while the contents of the delay line of the resolver filter are shifted by $\pm\Delta\theta$. A third measurement of the values of sin $\alpha$ and cos $\alpha$ is performed at time $t5$ and, if necessary, the resolver will be used a third time to shift the phase by $\pm\Delta\theta/2$ and to make a new, finer adjustment of the local clock between $t6$ and $t7$.

Thus, the local clock has been adjusted in a few operations by means of successive approximations. This result is achieved by appropriately using a resolver loop within the clock information recovery loop. Once the local clock has been adjusted, the receiver initialization time is over and switch S is opened. Thereafter, the only adjustments that remain to be made are those intended to correct slight drifts of the clocks. The latter adjustments are performed in accordance with well-known methods used in conventional digital receivers incorporating a phase-locked oscillator.

While the invention has been particularly shown and described with reference to the preferred embodiment thereof, it will be understood by those skilled in the art that various changes in form and details may be made therein without departing from the spirit and scope of the invention.

What is claimed is:

1. A digital filter of the purely recursive type, comprising a recursive loop including:

at least one adder stage and a delay means the output of which is fed back to the input of said adder stage for extracting from the input signal a sine wave component, said recursive loop further including a means for shifting the phase of said sine wave component by a predetermined increment value, said means for shifting the phase of said sine component including means for extracting from said delay line signal samples of the signal which are out of phase relatively to the sample coming out of said line, by ¼ and ¾ of a period, respectively;

means for subtracting said samples from each other;

weighting means and means for applying to the result of said subtracting operation a weighting coefficient proportional to the desired phase shifting increment before applying the new sample thus determined to the input of said adder together with the sample coming out of said shift register; and means for repeating this operation until the first sample processed appears in the last stage of said shift register.

2. A digital resolver and filter comprising:

a purely recursive digital filter including at least a first adder, to one of the inputs of which are fed samples of the signal to be filtered;

a multi-stage shift register, to the input of which are fed samples of the filtered signal from the output of said first adder, and the output of which is fed back to one of the inputs of said first adder; and, weighting means at the outputs of the stages of said shift register for weighting the magnitude of said samples of said filtered signals; and a resolver circuit means connected to the weighted signal outputs of said shift register and to a phase reference signal for determining the phase difference between said filtered signal and said given local reference signal, and for shifting the phase of said filtered signal still stored in said shift register so as to eliminate said phase difference.

3. A device as described in claim 1, wherein:

said means for determining said phase difference includes another adder to at least two inputs of which are fed signals taken at the taps located between the stages of said shift register, said signals being weighted in such a way as to obtain an expression of the cosine of said phase difference at the output of said another adder.

4. A recursive digital filtering and phase shifting device as described in claim 3, further including:
means for switching from the filtering function to the phase shifting function and vice versa.

5. Apparatus as described in claim 3, wherein:
said means for eliminating said phase differential includes means for recirculating through said first adder samples of the filtered signal stored in said shift register, both directly and after they have passed through said another adder and have been weighted by a coefficient proportional to said phase difference.

6. A recursive digital filtering and phase shifting device as described in claim 5, further including:
means for switching from the filtering function to the phase shifting function and vice versa.

7. A recursive digital filtering and phase shifting device as described in claim 1, further including:
means for switching from the filtering function to the phase shifting function and vice versa.

8. A device as described in claim 1, wherein:
said means for determining said phase difference includes a second adder to at least two inputs of which are fed signals taken at the taps located between the stages of said shift register, said signals being weighted by said weighting means in such a way as to obtain an expresssion of the sine of said phase difference at the output of said second adder.

9. Apparatus as described in claim 8, wherein:
said means for eliminating said phase differential includes means for recirculating through said first adder samples of the filtered signal stored in said shift register, both directly and after they have passed through said second adder and have been weighted by a coefficient proportional to said phase difference.

10. A recursive digital filtering and phase shifting device as described in claim 9, further including:
means for switching from the filtering function to the phase shifting function and vice versa.

11. A recursive digital filtering and phase shifting device as described in claim 8, further including:
means for switching from the filtering function to the phase shifting function and vice versa.

12. Apparatus for recovering the information associated with the synchronization of the clock of a receiver operating in the amplitude and/or phase modulation mode, comprising:
a resolver filter for extracting the clock information contained in the received signal envelope and for determining its phase relative to a given reference and for correcting the phase of said clock information by recirculating the data within said resolver filter while simultaneously correcting said reference;
said resolver filter comprising:
a purely recursive digital filter including at least a first adder, to one of the inputs of which are fed samples of the signal to be filtered;
a multi-stage shift register, to the input of which are fed samples of the filtered signal from the output of said first adder, and the output of which is fed back to one of the inputs of said first adder; and weighting means at the outputs of the stages of said shift register for weighting the magnitude of said samples of said filtered signals; and
a resolver circuit means connected to the weighted signal outputs of said shift register and to a phase reference signal for determining the phase difference between said filtered signal and said given local refrence signal, and for shifting the phase of said filtered signal still stored in said shift register so as to eliminate said phase difference.

13. Apparatus as described in claim 12, wherein:
said means for determining said phase difference includes a second adder to at least two inputs of which are fed signals taken at the taps located between the stages of said shift register, said signals being weighted by said weighting means in such a way as to obtain an expression of the sine of said phase difference at the output of said second adder.

14. Apparatus as described in claim 13, further including:
means for switching from the filtering function to the phase shifting function and vice versa.

15. Apparatus as described in claim 13, wherein:
said means for eliminating said phase differential includes means for recirculating through said first adder samples of the filtered signal stored in said shift register, both directly and after they have passed through said second adder and have been weighted by a coefficient proportional to said phase difference.

16. Apparatus as described in claim 15, further including:
means for switching from the filtering function to the phase shifting function and vice versa.

17. Apparatus as described in claim 12, wherein:
said means for determining said phase difference includes another adder to at least two inputs of which are fed signals taken at the taps located between the stages of said shift register, said signals being weighted in such a way as to obtain an expression of the cosine of said phase difference at the output of said another adder.

18. Apparatus as described in claim 17, wherein:
said means for eliminating said phase, differential includes means for recirculating through said first adder samples of the filtered signal stored in said shift register, both directly and after they have passed through said another adder and have been weighted by a coefficient proportional to said phase difference.

19. Apparatus as described in claim 17, further including:
means for switching from the filtering function to the phase shifting function and vice versa.

20. Apparatus as described in claim 12, wherein said means for eliminating said phase differential includes:
at least one adder stage and a delay means, the output of which is fed back to the input of said adder stage for extracting from the input signal a sine wave component, said recursive loop further including a means for shifting the phase of said sine wave component by a predetermined increment value, said means for shifting the phase of said sine component including means for extracting from said delay line signal samples of the signal which are out of phase relatively to the sample coming out of said line, by ¼ and ¾ of a period, respectively;
means for subtracting said samples from each other;

weighting means and means for applying to the result of said subtracting operation a weighting coefficient proportional to the desired phase shifting increment before applying the new sample thus determined to the input of said adder together with the sample coming out of said shift register; and means for repeating this operation until the first sample processed appears in the last stage of said shift register.

21. Apparatus as described in claim 12, further including:

means for switching from the filtered function to the phase shifting function and vice versa.

22. Apparatus for recovering the clock information contained in received analog signals and for synchronizing the local clock of a data receiver operating in the amplitude and/or phase modulation mode, comprising:

conversion means under the control of said local clock for converting the analog signals applied to said receiver into digital signal samples;

digital means for determining the envelope of said samples;

means for applying said envelope to a digital resolver and filter while said resolver and filter is operating as a filter, said digital resolver and filter comprising:

a purely recursive digital filter including at least a first adder, to one of the inputs of which are fed samples of the signal to be filtered;

a multi-stage shift register, to the input of which are fed samples of the filtered signal from the output of said first adder, and the output of which is fed back to one of the inputs of said first adder; and, weighting means at the outputs of the stages of said shift register for weighting the magnitude of said samples of said filtered signals; and a resolver circuit means connected to the weighted signal outputs of said shift register and to a phase reference signal for determining the phase difference between said filtered signal and said given local reference signal, and for shifting the phase of said filtered signal still stored in said shift register so as to eliminate said phase difference;

means for determining the phase of said filtered signals relative to given characteristic instants of said clock information contained in said received signals;

means for recirculating said samples in said shift register of said digital resolver and filter while it is operating as a resolver circuit, thereby to shift the phase of said signal sampled by a given incremental value; and means for adjusting the local clock of said receiver simultaneously with said shifting operation of the phase of said samples so as to compensate for the phase error detected by said resolver circuit.

23. Apparatus as described in claim 22, wherein:

said means for determining said phase difference includes a second adder to at least two inputs of which are fed signals taken at the taps located between the stages of said shift register, said signals being weighted by said weighting means in such a way as to obtain an expression of the sine of said phase difference at the output of said second adder.

24. Apparatus as described in claim 23, wherein:

said means for eliminating said phase differential includes means for recirculating through said first adder samples of the filtered signals stored in said shift register, both directly and after they have passed through said second adder and have been weighted by a coefficient proportional to said phase difference.

25. Apparatus as described in claim 22, wherein:

said means for determining said phase difference includes another adder to at least two inputs of which are fed signals taken at the taps located between the stages of said shift register, said signals being weighted in such a way as to obtain an expression of the cosine of said phase difference at the output of said third adder.

26. Apparatus as described in claim 25, wherein:

said means for eliminating said phase differential includes means for recirculating through said first adder samples of the filtered signal stored in said shift register, both directly and after they have passed through said another adder and have been weighted by a coefficient proportional to said phase difference.

27. Apparatus as described in claim 22, further including:

at least one adder stage and a delay means the output of which is fed back to the input of said adder stage for extracting from the input signal a sine wave component, said recursive loop further including a means for shifting the phase of said sine wave component by a predetermined increment value, said means for shifting the phase of said sine component including means for extracting from said delay line signal samples of the signal which are out of phase relatively to the sample coming out of said line, by ¼ and ¾ of a period, respectively;

means for subtracting said samples from each other;

weighting means and means for applying to the result of said subtracting operation a weighting coefficient proportional to the desired phase shifting increment before applying the new sample thus determined to the input of said adder together with the sample coming out of said shift register; and means for repeating this operation until the first sample processed appears in the last stage of said shift register.

* * * * *